United States Patent
He et al.

(10) Patent No.: US 11,467,591 B2
(45) Date of Patent: *Oct. 11, 2022

(54) ONLINE AGENT USING REINFORCEMENT LEARNING TO PLAN AN OPEN SPACE TRAJECTORY FOR AUTONOMOUS VEHICLES

(71) Applicant: Baidu USA LLC, Sunnyvale, CA (US)

(72) Inventors: Runxin He, Sunnyvale, CA (US); Jinyun Zhou, Sunnyvale, CA (US); Qi Luo, Sunnyvale, CA (US); Shiyu Song, Sunnyvale, CA (US); Jinghao Miao, Sunnyvale, CA (US); Jiangtao Hu, Sunnyvale, CA (US); Yu Wang, Sunnyvale, CA (US); Jiaxuan Xu, Sunnyvale, CA (US); Shu Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 16/413,332

(22) Filed: May 15, 2019

(65) Prior Publication Data

US 2020/0363813 A1 Nov. 19, 2020

(51) Int. Cl.
*G05D 1/02* (2020.01)
*G06N 3/08* (2006.01)
*G06N 3/04* (2006.01)

(52) U.S. Cl.
CPC .......... *G05D 1/0221* (2013.01); *G05D 1/0217* (2013.01); *G06N 3/0454* (2013.01); *G06N 3/088* (2013.01); *G05D 2201/0213* (2013.01)

(58) Field of Classification Search
CPC ............. B60W 60/0011; G05D 1/0217; G05D 1/0221; G05D 2201/0213; G06N 3/006; G06N 3/0454; G06N 3/0481; G06N 3/088
See application file for complete search history.

(56) References Cited

U.S. PATENT DOCUMENTS 9,174,672 B2 * 11/2015 Zeng .................... B60R 21/0134
9,731,755 B1 * 8/2017 Moshchuk ............... B62D 6/00
10,118,610 B2 * 11/2018 Deng ................. B60W 30/0956
(Continued)

OTHER PUBLICATIONS

Zhang et al., "Optimization-Based Collision Avoidance", Published in ArXiv 2017, 27 pages.

*Primary Examiner* — Babar Sarwar
(74) *Attorney, Agent, or Firm* — Womble Bond Dickinson (US) LLP

(57) ABSTRACT

In one embodiment, a system uses an actor-critic reinforcement learning model to generate a trajectory for an autonomous driving vehicle (ADV) in an open space. The system perceives an environment surrounding an ADV. The system applies a RL algorithm to an initial state of a planning trajectory based on the perceived environment to determine a plurality of controls for the ADV to advance to a plurality of trajectory states based on map and vehicle control information for the ADV. The system determines a reward prediction by the RL algorithm for each of the plurality of controls in view of a target destination state. The system generates a first trajectory from the trajectory states by maximizing the reward predictions to control the ADV autonomously according to the first trajectory.

15 Claims, 17 Drawing Sheets

(56) References Cited

U.S. PATENT DOCUMENTS

| | | | |
|---|---|---|---|
| 2009/0088916 A1* | 4/2009 | Elgersma | G05D 1/106 |
| | | | 701/23 |
| 2017/0008521 A1* | 1/2017 | Braunstein | G01C 21/32 |
| 2017/0090476 A1* | 3/2017 | Letwin | G05D 1/0088 |
| 2018/0124423 A1* | 5/2018 | Choi | H04N 19/52 |
| 2018/0129203 A1* | 5/2018 | Tafti | G05D 1/0217 |
| 2018/0156632 A1* | 6/2018 | Jung | G01C 21/3685 |
| 2018/0164827 A1* | 6/2018 | Chu | G05D 1/0274 |
| 2018/0362025 A1* | 12/2018 | Oppolzer | B62D 15/0285 |
| 2019/0118801 A1* | 4/2019 | Noh | B60W 30/06 |
| 2019/0235516 A1* | 8/2019 | Zhang | B60W 30/00 |
| 2019/0251169 A1 | 8/2019 | Loghmani | |
| 2020/0023841 A1* | 1/2020 | Hayama | B60W 30/09 |
| 2020/0139967 A1* | 5/2020 | Beller | G05D 1/0223 |
| 2020/0156631 A1* | 5/2020 | Lin | G05D 1/0251 |
| 2021/0116916 A1* | 4/2021 | He | G05D 1/0214 |

\* cited by examiner

ONLINE AGENT USING REINFORCEMENT LEARNING TO PLAN AN OPEN SPACE TRAJECTORY FOR AUTONOMOUS VEHICLES

TECHNICAL FIELD

Embodiments of the present disclosure relate generally to operating autonomous vehicles. More particularly, embodiments of the disclosure relate to an online agent using reinforcement learning to plan an open space trajectory for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Trajectories are usually planned based on traffic lanes/reference lines which are pre-labeled within a high-definition (HD) map. This process limits the applicable scenarios for autonomous vehicles with full autonomous driving, such as, in open space scenarios, where the model has to plan trajectories (e.g., parking, U-turn, or three point turns) without a reference lane, and at the same time, to avoid a collision.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
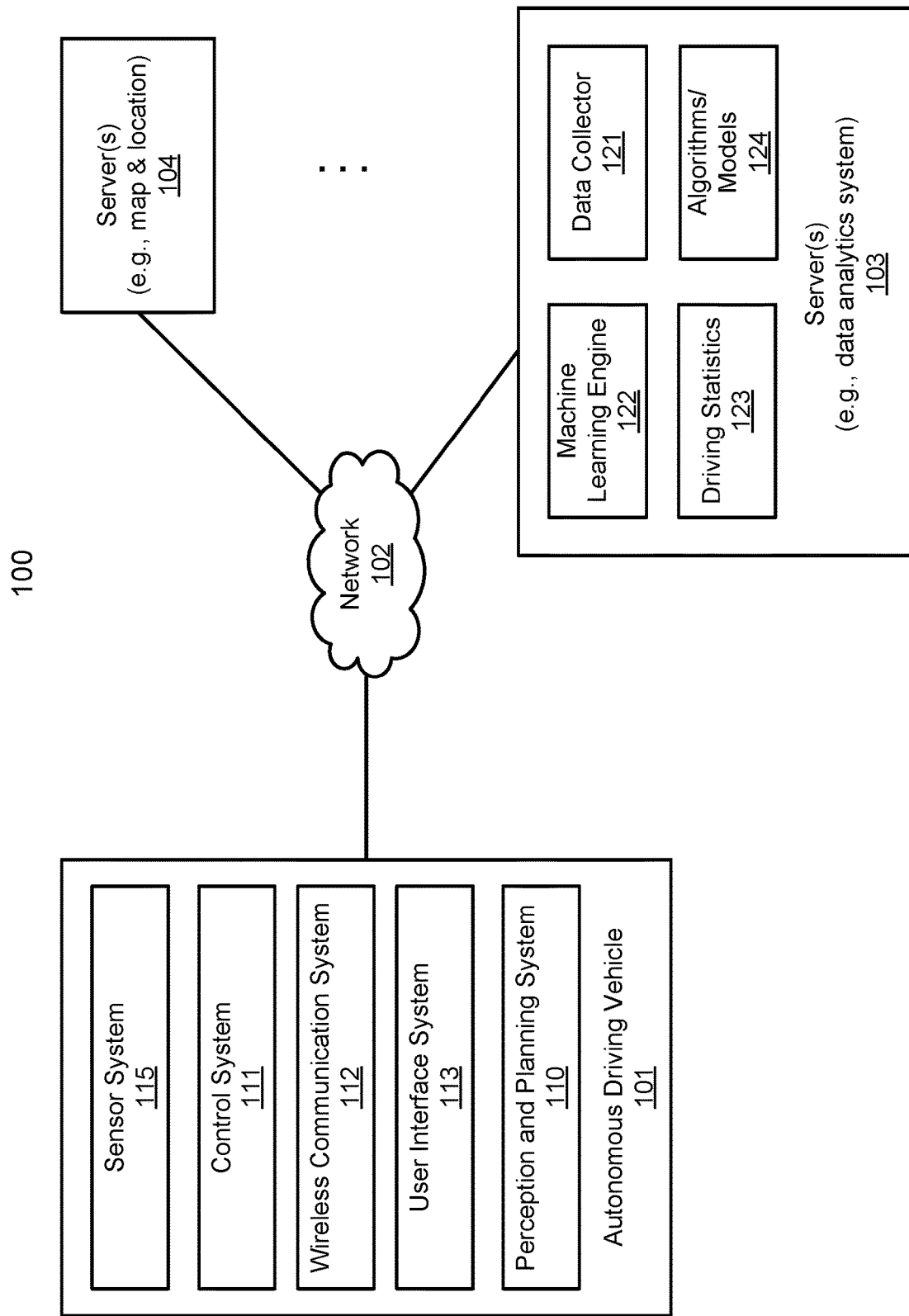
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to a first aspect, an open space model is generated for a system to plan trajectories for an ADV in an open space. The system perceives an environment surrounding an ADV including one or more obstacles. The system determines a target function for the open space model based on constraints for the one or more obstacles and map information. The system iteratively, performs a first quadratic programming (QP) optimization on the target function based on a first trajectory while fixing a first set of variables, and performs a second QP optimization on the target function based on a result of the first QP optimization while fixing a second set of variables. The system generates a second trajectory based on results of the first and the second QP optimizations to control the ADV autonomously according to the second trajectory.

According to a second aspect, a system uses an actor-critic reinforcement learning (RL) model to generate a trajectory for an ADV in an open space. The system perceives an environment surrounding an ADV. The system applies a RL algorithm to an initial state of a planning trajectory based on the perceived environment to determine a number of controls for the ADV to advance to a number of trajectory states based on map and vehicle control information for the ADV. The system determines a reward prediction by the RL algorithm for each of the controls in view of a target destination state. The system generates a first trajectory from the trajectory states by maximizing the reward predictions to control the ADV autonomously according to the first trajectory.

According to a third aspect, a system generates a plurality of driving scenarios to train a RL agent and replays each of the driving scenarios to train the RL agent by: applying a RL algorithm to an initial state of a driving scenario to determine a number of control actions from a number of discretized control/action options for the ADV to advance to a number of trajectory states which are based on a number of discretized trajectory state options, determining a reward prediction by the RL algorithm for each of the controls/actions, determining a judgment score for the trajectory states, and updating the RL agent based on the judgment score.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
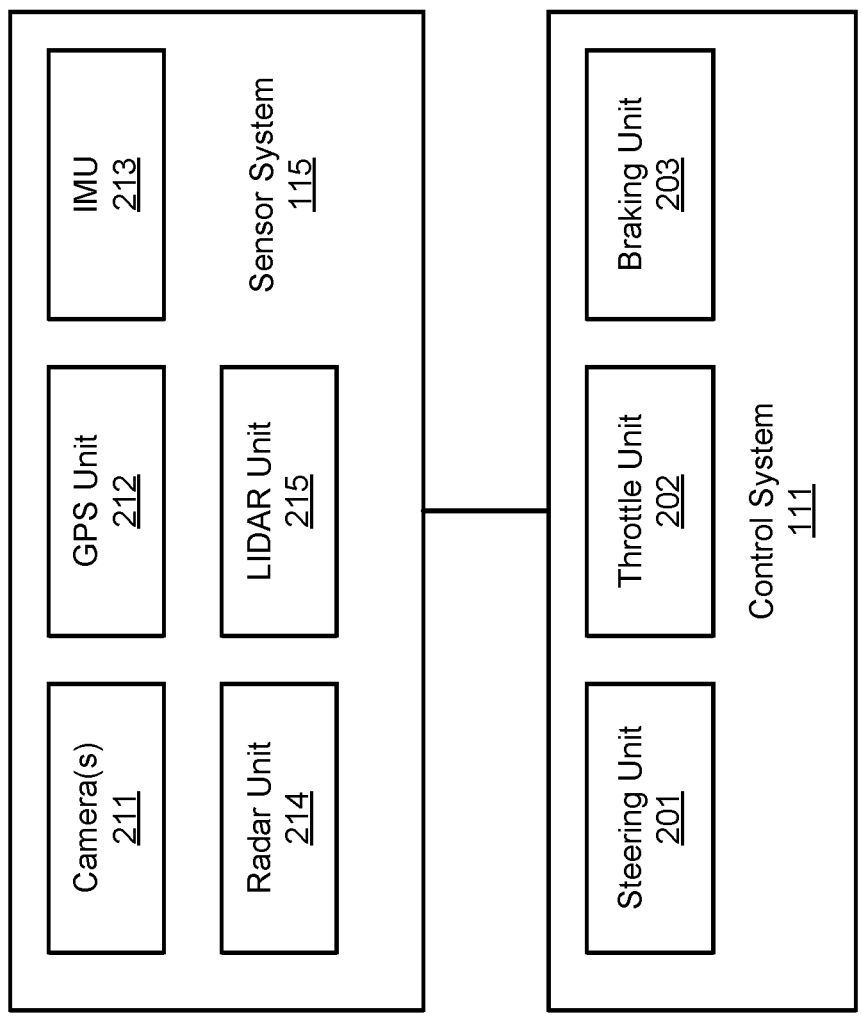
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms/models 124 may include a bicycle model to model the vehicle dynamics for the ADV, an open space optimization model or an RL agent/environment model to plan a trajectory for the ADV in an open space. Algorithms/models 124 can then be uploaded on ADVs (e.g., models 313 of FIG. 3A) to be utilized by the ADVs in real-time.

Figure 3A:
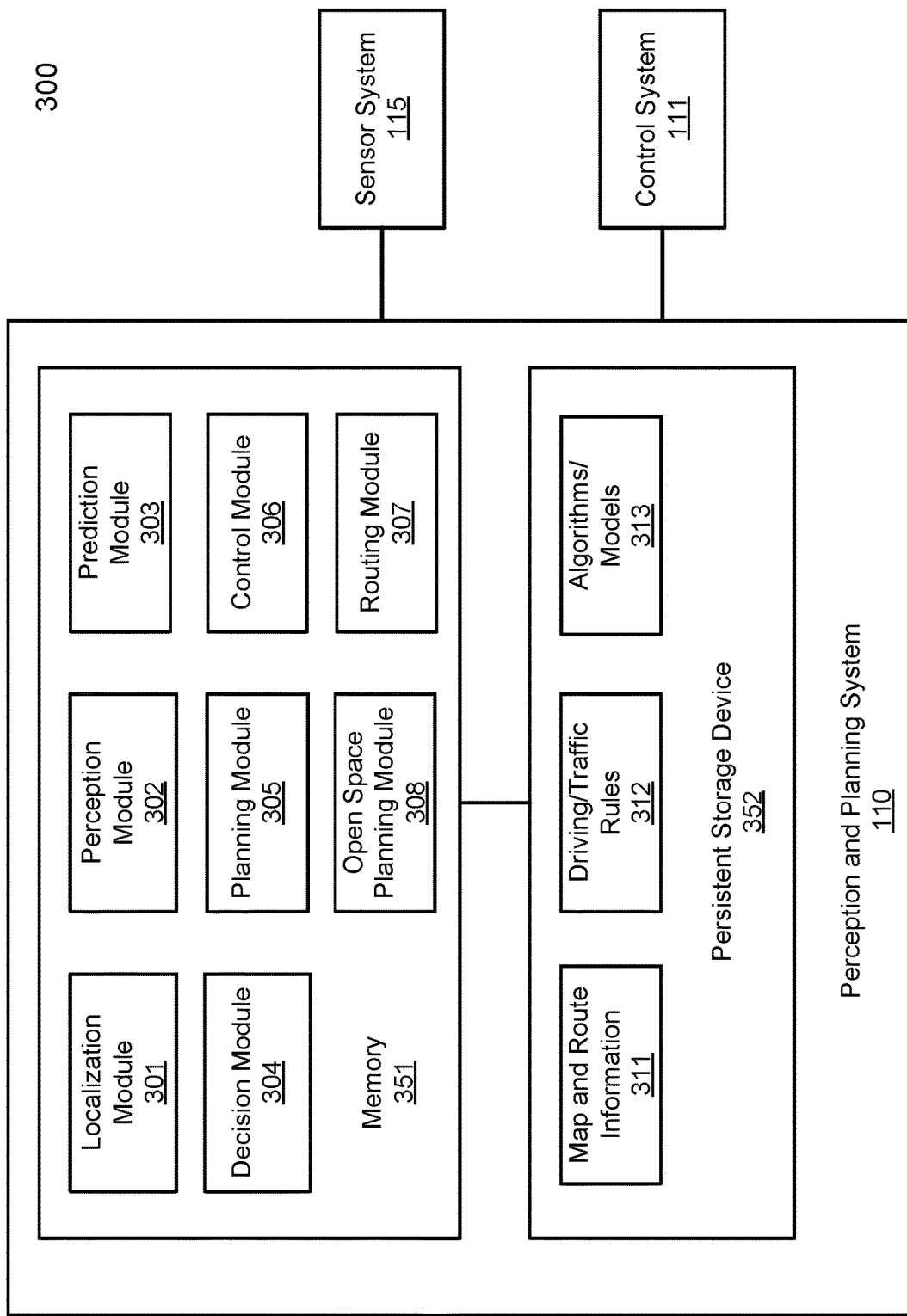
FIGS. 3A-3B are block diagrams illustrating an example of a perception and planning system used with an autonomous vehicle according to one embodiment.
Figure 3B:
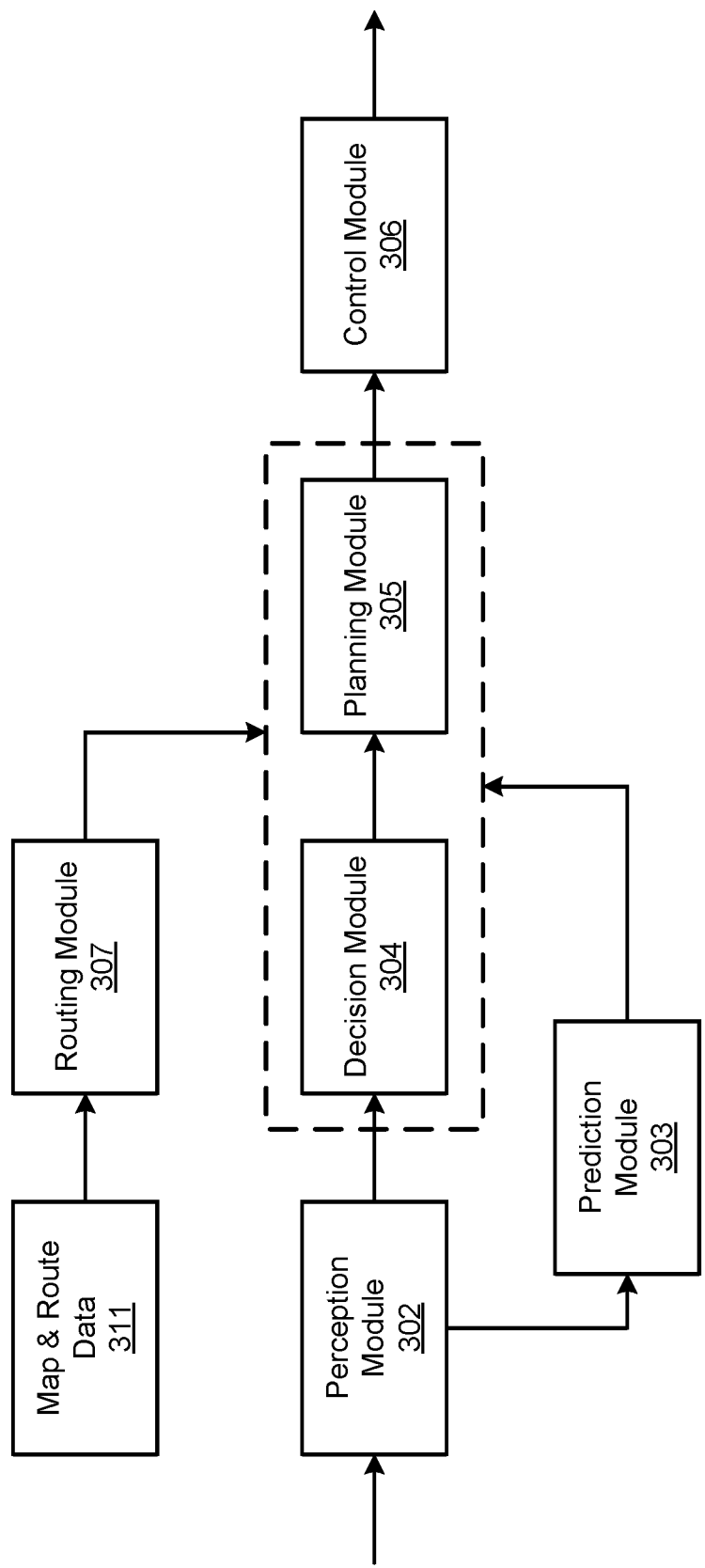

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and open space planning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, planning module 305 and open space planning module 308 may be an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
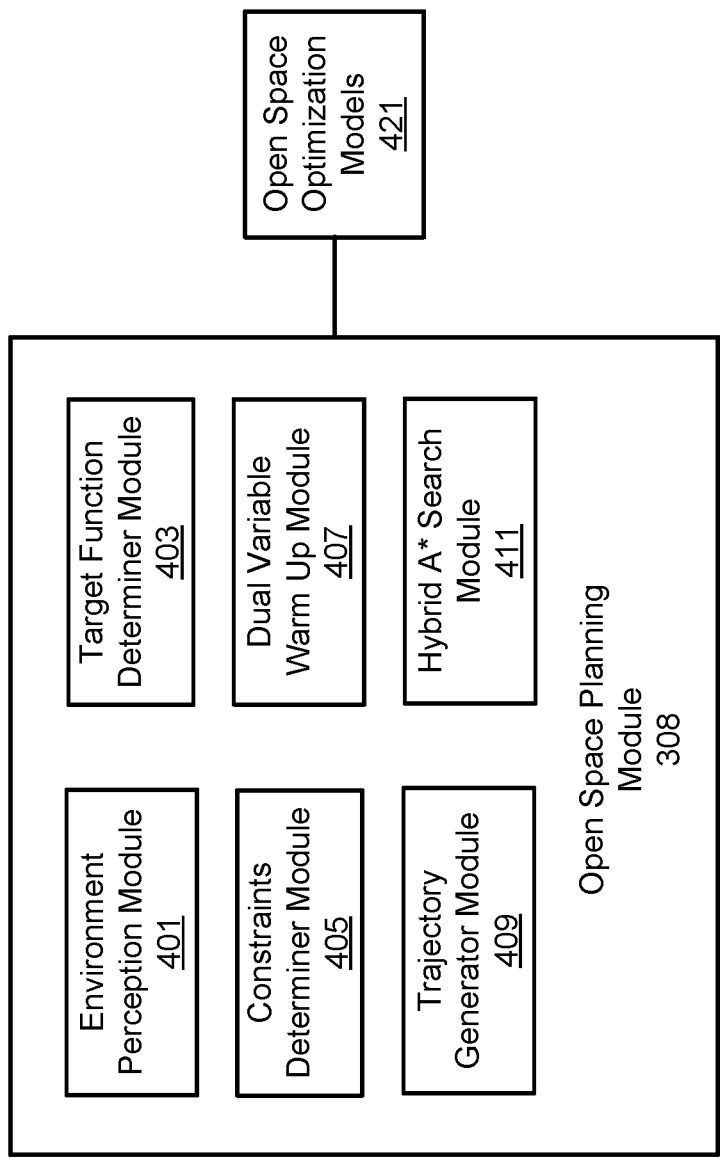
FIG. 4 is a block diagram illustrating an example of an open space planning module according to one embodiment.

FIG. 4 is a block diagram illustrating an example of an open space planning module according to one embodiment. Open space planning module 308 can generate a trajectory for an ADV in an open space, where there is no reference lines or traffic lanes to be followed. Examples of an open space include a parking lot, or a roadway where a vehicle performs a parallel parking, a U-turn, or a three point turn. Referring to FIG. 4, in one embodiment, open space planning module 308 includes environment perception module 401, target function determiner module 403, constraints determiner module 405, dual variable warming up module 407, trajectory generator module 409, and hybrid A* search module 411. Environment perception module 401 can perceives an environment of the ADV. Target function determiner module 403 can determine a target function for an optimization model (e.g., open space optimization model 421 (as part of models 313 of FIG. 3A)) to optimize. Constraints determiner module 405 can determine constraints for the optimization model. Constraints can include inequality, equality, and bound constraints. Dual variable warming up module 407 can apply a quadratic programming solver to a target (objective) function to solve for one or more variables (such as dual/two variables) subject to some constraints, where the target function is a quadratic function. Trajectory generator module 409 can generate a trajectory based on the solved variables. Hybrid A* search module 411 can search for an initial trajectory (zig zag, non-smooth trajectory without consideration for observed obstacles)

using a search algorithm, such as an A* search algorithm, or a hybrid A* search algorithm.

Figure 5:
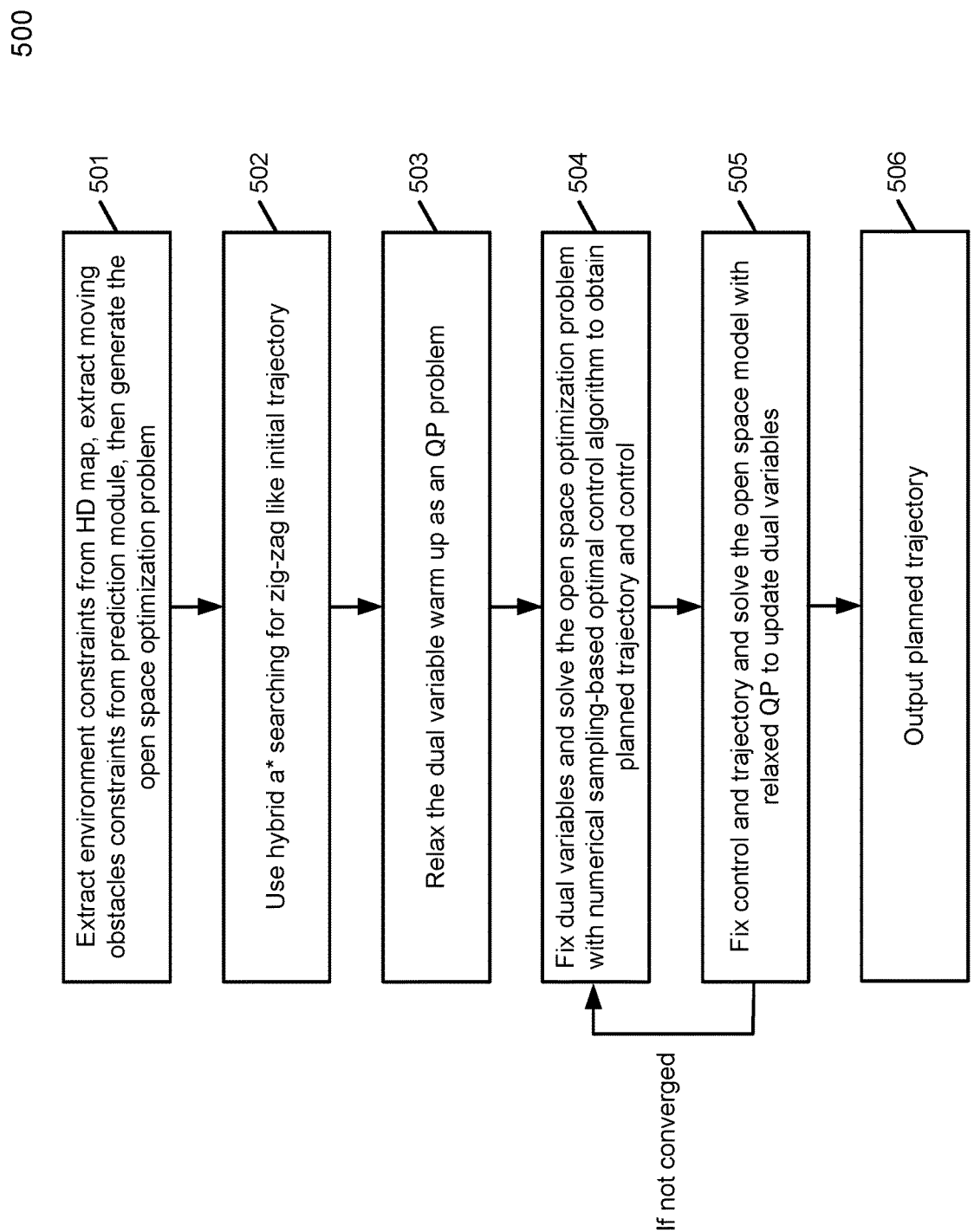
FIG. 5 is a flowchart illustrating an example of a work flow for the open space planning module according to one embodiment.

FIG. 5 is a flowchart illustrating an example of a work flow for the open space planning module for an ADV according to one embodiment. Referring FIG. 5, in operation 501, processing logic extracts environment constraints from HD map, and moving obstacles constraints from prediction module to generate the open space optimization algorithm, and initializes matrices/vectors for the constraints of the optimization algorithm. In one embodiment, the optimization model can be previously generated and uploaded on the ADV (e.g., model 421 of FIG. 4, as part of models 313 of FIG. 3A). Constraints can include distances from the vehicle to the open road boundaries, dimensions of accessible roadways, road curbs, and one or more obstacles. The obstacles can include moving obstacles such as cars and moving pedestrians, and nonmoving obstacles such as buildings, blockades, and fences. The moving obstacles can be processed by a prediction module to determine the predicted locations for the moving obstacles at some later point in time. These obstacles and constraints can be modeled into matrices and vectors for an optimization algorithm.

An example of an optimization algorithm for a controlled object and obstacles can be given as:

$$\min_{x,u,\lambda,\mu} \Sigma_{k=0}^{N} l(x_k+u_k), \text{ such that, } \|A^{(m)^T}\lambda_k^{(m)}\| \leq 1$$

$$-g^T\mu_k^{(m)} + (A^{(m)}t(x_k)-b^{(m)})^T\lambda_k^{(m)} > 0,$$

$$G^T\mu_k^{(m)} + R(x_k)^T A^{(m)^T}\lambda_k^{(m)} = 0,$$

$$h(x_k+u_k) \leq 0, \lambda \geq 0, \text{ and } \mu \geq 0,$$

where $x_k$ is a trajectory for discretized time step k, $x_0=x(0)$ is initial point, and $x_{N+1}=x_F$ is destination point of the trajectory, and $x_{k+1}=f(x_k+u_k)$. Here, $u_k$ can be vehicle control inputs, such as a heading angle, velocity, and acceleration of the vehicle, and f is a vehicle dynamic model which describes a vehicle dynamic, such as a bicycle model of a vehicle. $h(x_k+u_k)$ include limitations of the vehicle, such as maximum heading ratio, velocity, and acceleration of the vehicle. Matrix A and vector b relates to sizes and locations of one or more obstacles surrounding the vehicle. Here, the obstacles can be modeled as polygons. $g^T$ and $G^T$ relate to a size and location of the ADV, respectively. $\lambda$ and $\mu$ describe dual variables representing distances between obstacles and the vehicle, and R is a rotation matrix, measuring a rotation of the vehicle relative to the obstacles, based on a reference direction of the vehicle. Note, however, some variables may not be initialized without an initial trajectory, e.g., R is not defined without an initial trajectory.

For operation 502, processing logic can apply a hybrid a* search algorithm to a simplified vehicle model to search for an initial (coarse) trajectory using the initial and destination states as input parameters. Here, hybrid A* search can grid the state space (x, y, θ-direction) into one or more branches and perform a tree search within the state space grid branches. The tree search can traverse all branch nodes using a simplified vehicle model to generate a coarse trajectory connecting an initial state to a destination state. The simplified vehicle model can be a simple bicycle model that can travel at various velocities within a range of steering which models an ADV, or the coarse trajectory can simply be a step-wise function that connects two points with a shortest distance. However, the generated coarse trajectory may be zig-zag shaped and may not take into consideration any surrounding obstacles. Based on the coarse trajectory, some variables of the optimization problem described above can thus be determined. An example of such a variable include R, where R is a rotation matrix, measuring a rotation of the vehicle relative to obstacles, based on a reference direction of the vehicle.

For operation 503, in one embodiment, the open space optimization problem or the optimization algorithm can be relaxed into an algorithm with a quadratic target function to be solved. The quadratic target function can be:

$$\min_{x,u,\lambda,\mu} \Sigma_{k=0}^{N} \|A^{(m)^T}\lambda_k^{(m)}\|^2, \text{ where}$$

$$-g^T\mu_k^{(m)} + (A^{(m)}t(x_k)-b^{(m)})^T\lambda_k^{(m)} > 0,$$

$$G^T\mu_k^{(m)} + R(x_k)^T A^{(m)^T}\lambda_k^{(m)} = 0,$$

$$h(x_k+u_k) \leq 0, \lambda \geq 0, \text{ and } \mu \geq 0,$$

The relaxed quadratic function can then be solved by a quadratic programming algorithm, which is more computationally efficient than the interior point convex numerical method, which would be otherwise be required to solve the non-relaxed open space optimization problem. In one embodiment, the relaxed quadratic target function is part of models 421 of FIG. 4.

For operation 504, process logic fixes the dual variables (e.g., a first set of vector variables) and solves the relaxed open space optimization problem using a QP solver to obtain a planning trajectory and a sequence of controls. For example, a QP algorithm is applied to solve the equation $\min_{x,u}\|A^{(m)^T}\lambda_k^{(m)}\|^2$ where vectors $\lambda, \mu$ are set to some initial constant values.

For operation 505, process logic fixes the controls and trajectory values (e.g., x, u, as a second set of vector variables) and solves the relaxed open space optimization problem with a QP solver to update the dual variables, e.g., $\min_{\lambda,\mu}\|A^{(m)^T}\lambda_k^{(m)}\|^2$ where vectors x, u are set to the values from the results of operation 504. Next, operation 504 can be repeated with $\lambda$, $\mu$ set to the results of operation 505. Then operations 504 and 505 can be iteratively performed until the variables (e.g., x, u, $\lambda$, $\mu$) converge. The variable can converge if the results for subsequent iterations are within a predetermined threshold of the results from the previous iteration. Once the output values converge, at operation 506, processing logic generates an output trajectory $x_{(k=0\ldots N+1)}$ based on the results of operations 504-505. Note that $x_0$ is the initial trajectory state, and $x_{N+1}=x_F$ is the final trajectory state.

Figure 6:
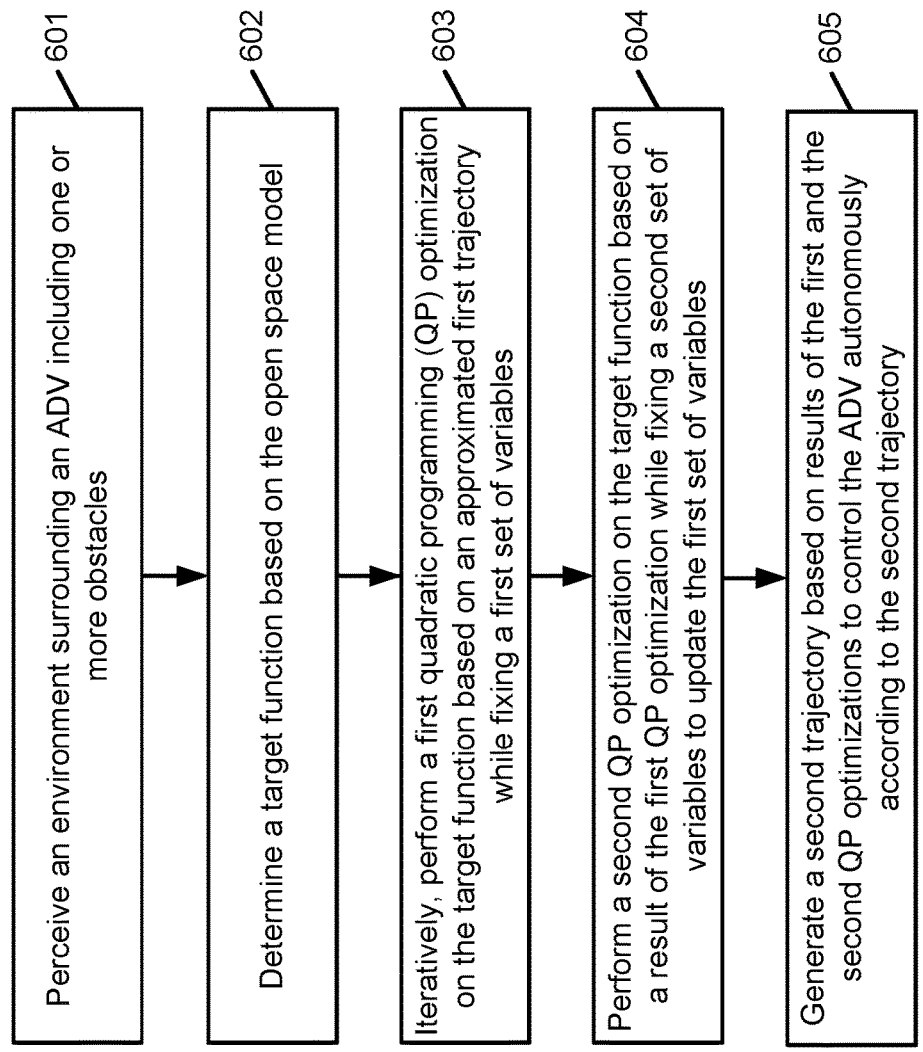
FIG. 6 is a flow diagram illustrating an example method according to one embodiment.

FIG. 6 is a flow diagram illustrating an example method according to one embodiment. Process 600 may be performed by processing logic which may include software, hardware, or a combination thereof. For example, process 600 may be performed by open space planning module 308 of FIG. 4. Referring to FIG. 6, at block 601, processing logic perceives an environment surrounding an ADV including one or more obstacles. At block 602, processing logic determines a target function for an open space model based on constraints for the one or more obstacles and map information. At block 603, processing logic, iteratively, performs a first quadratic programming (QP) optimization on the target function based on a first trajectory (e.g., coarse trajectory) while fixing a first set of variables (e.g., $\lambda$, $\mu$). At block 604, processing logic performs a second QP optimization on the target function based on a result of the first QP optimization while fixing a second set of variables (e.g., x, u). At block 605, processing logic generates a second trajectory based on results of the first and the second QP optimizations to control the ADV autonomously according to the second trajectory.

In one embodiment, processing logic further applies a hybrid A* search algorithm to the open space model or an alternate simplified vehicle model to generate the first trajectory. In one embodiment, the first set of variables includes dual variables which relates to calculation of distance between obstacles and the ADV. In one embodiment, the second set of variables includes variables for control of the ADV and trajectory.

In one embodiment, the target function includes a quadratic cost function for the first and the second QP optimizations. In one embodiment, the open space model is to generate a trajectory for the ADV without following a reference line or traffic lines. In one embodiment, the open space model includes a vehicle dynamic model for the ADV.

Figure 7:
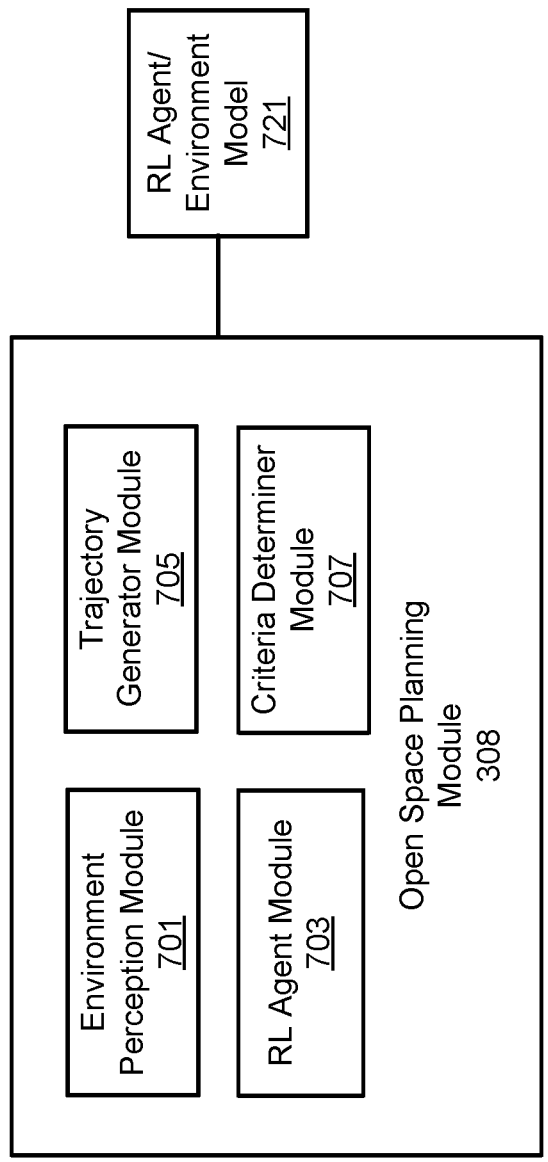
FIG. 7 is a block diagram illustrating an example of an open space planning module according to another embodiment.

FIG. 7 is a block diagram illustrating an example of an open space planning module according to another embodiment. Open space planning module 308 can generate a trajectory using a RL agent for an ADV in an open space, where there is no reference lines or traffic lanes to be followed. Referring to FIG. 7, in one embodiment, open space planning module 308 includes environment perception module 701, RL agent module 703, trajectory generator module 705, and criteria determiner module 707. Environment perception module 701 can perceives an environment of the ADV. The environment perceived includes information for locations and sizes of perceived obstacles. The environment can further include map and geographical information, shapes and sizes of parking lot and/or road for the ADV. The perceived information can further include information about the ADV, such as position, speed and a targeted parking spot for the ADV. RL agent module 703 can apply a RL agent (e.g., RL agent/environment model 721, as part of model 313 of FIG. 3A) to an observed environment of the ADV, e.g., an initial trajectory state of the ADV. The RL agent 721 can include an actor-critic framework, where the actor includes a policy decision to determine a control or action for the ADV for a given state, and the critic includes a measurement scheme to determine a value or reward prediction for the action based on the given state. The environment model can model a perceived environment of the ADV, vehicle dynamics, vehicle control limits, and a reward grading or scoring metric, such that the environment model can generate an actual reward and a next trajectory state based on an action and a current trajectory state for the ADV. Thus, the RL agent and the environment model can iteratively generate a number of next trajectory states (e.g., an output trajectory) and a number of controls/actions. The scoring metric can include a scoring scheme to evaluate whether the RL agent planned a trajectory with a final trajectory state at the destination spot, whether the trajectory is smooth, whether the trajectory avoids all the perceived obstacles.

Referring to the actor-critic framework, in one embodiment, the actor includes a first neural network, and the critic includes a second neural network. In another embodiment, critic includes a scoring equation/formula. The first and second neural networks can be deep neural networks. Trajectory generator module 705 can generate a trajectory for the ADV based on a current trajectory state of the ADV to control the ADV to a destination state. Criteria determiner module 707 can contain a judgment logic to compare an output trajectory of an RL agent (as part of RL agents 721). The comparison can be based on a reference trajectory which can be an output trajectory from an optimization model (as part of optimization models 421 of FIG. 4). The judgment logic can determine if the comparison results in a difference below a threshold.

Figure 8:
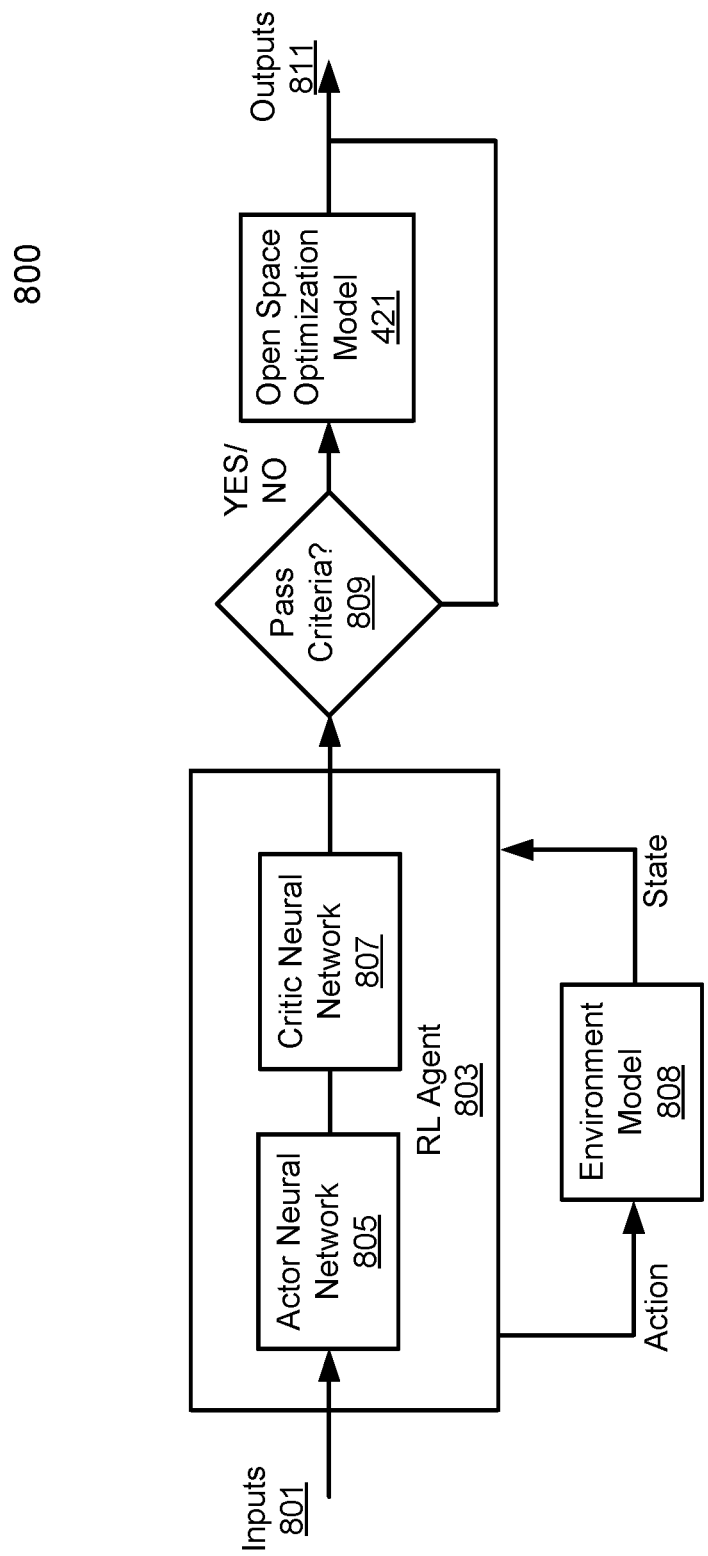
FIG. 8 is a block diagram illustrating an example of a system using a reinforcement learning agent according to one embodiment.

FIG. 8 is a block diagram illustrating an example of a system using a reinforcement learning agent according to one embodiment. The system 800 can generate a driving trajectory for an ADV in an open space environment, such as a parking lot, where the open space environment may not have reference trajectories or traffic markings to guide the ADV. Referring to FIG. 8, in one embodiment, system 800 includes RL agent 803 which receives inputs 801. RL agent 803 can interact with environment model 808 to generate discretized trajectory states (e.g., $x_0 \ldots x_F$) and controls (e.g., $u_0 \ldots u_F$) by applying a reinforcement learning algorithm to inputs 801. The trajectory and controls outputs are passed through a criteria evaluation 809 (e.g., performed by criteria determiner module 707). Criteria evaluation 809 can evaluate if the trajectory/controls generated by RL agent 803 satisfies a list of threshold criteria (or a threshold judgment score), if yes, the trajectory and controls are output to outputs 811. If the judgment score is not satisfactory, criteria determiner 809 can trigger outputs 811 to output a second trajectory/second list of controls from open space optimization model 421. In one embodiment, the threshold criteria can be determined based on a feedback from open space optimization model 421. For example, the open space optimization model 421 can output a trajectory and controls (as a reference trajectory) to criteria evaluation 809 for criteria evaluation 809 to compare with the outputs of RL agent 803. Thus, RL agent 803 can learn from its actions and experiences in comparing to outputs of optimization model 421. As described above, open space optimization model 421 can include a model for vehicle dynamics of the ADV. Note, reinforcement learning (RL) refers to a type of machine learning technique that enables an agent (e.g., RL agent 803) to learn in an interactive environment (e.g., environment model 808) by trial and error using feedback from its actions and experiences. Machine learning (ML) relates to algorithms and statistical models to perform a specific task (here, to generate a driving trajectory) without using explicit instructions, but instead relies on patterns and inferences.

In one embodiment, RL agent 803 includes an actor critic framework. The actor can include a policy function generator to generate a list of controls (or actions) from a current trajectory state and the critic includes a value function to determine value predictions for the controls generated by the actor. In one embodiment, the actor-critic framework includes an actor neural network 805 coupled to a critic neural network 807. In one embodiment, actor neural network 805 and/or critic neural network 807 are deep neural networks, isolated from each other. In another embodiment, actor neural network 805 and critic neural network 807 runs in parallel. Note, a neural network (as part of machine learning) is a computational approach based on a large collection of neural units or neurons in a series of hidden layers or inner layers. Each hidden layer is made up of a set of neurons, where each neuron is connected to one or more neurons in the previous layer, and where neurons in a single layer can function completely independently and may not share any connections with other neurons of the layer. A neural network is self-learning and trained, rather than explicitly programmed. A deep neural network is a neural network with two or more hidden layers.

In one embodiment, actor neural network can include a multilayer perceptron (MLP). A MLP is a feedforward neural network which includes at least an input layer, one or more hidden layers with a first set of weights, and an output layer. The input layer of actor neural network 805 can receive inputs 801. Inputs 801 can include information for a perceived environment and vehicle control information for the ADV. For example, the environment information can include locations and sizes of perceived obstacles, and map and geographical information, such as shapes and sizes of parking lot and/or road of the ADV. The vehicle control information can include information about the ADV, such as current position, speed, direction, and a target position, direction, speed for the ADV. In one embodiment, critic neural network can include a MLP. The critic neural network includes one or more hidden layers that include a second set of weights that must be optimized separately from the first set of weights of the actor neural network. Note, the hidden layers and/or the output layers can have different activation function, such as a linear, sigmoid, tanh, RELU, softmax, etc.

Referring to FIG. 8, at each discretized time step, actor NN 805 receives a current trajectory state and generates a control/action. The environment model 808 receives the control action, generates a reward and a next trajectory state, and passes the reward and next trajectory state back to RL agent 803. Actor NN 805 of RL agent 803 uses the next trajectory state to generate a subsequent control action. These operations can be repeated until the next trajectory state is at a destination trajectory state (e.g., destination location) or the iterations have reached a maximum threshold count. In one embodiment, critic NN 807 performs a reward prediction based on the current trajectory state and the control action to evaluate how good is the particular control action. Critic NN 807 of RL agent 803 can also use an actual reward generated by the environment model 808 to update its reward predictions.

In one embodiment, for each time step, actor NN 805 may update its first set of weights based on a result of the critic NN 807, and critic NN 807 can update its second set of weights based on a result of actor NN 805, based on time difference (TD) learning. In effect, the RL agent/environment model may be updated online while the vehicle is in operation. Note, TD learning refers to a process for reinforcement learning to learn how to predict a value depending on future values of a given state. The reward/value predictions are adjusted once the actual reward values outcome is known. TD learning adjusts the weights so that a prediction of the next iteration is more accurate.

Based on the states (e.g., a first trajectory) and control actions, criteria module 809 can determine if the outputs of RL agent 803 satisfies a predetermined list of criteria. The criteria can include 1) a criteria whether the final state for the trajectory of the ADV is at a destination spot, with a correct vehicle heading, 2) the trajectory is smooth, and 3) the trajectory avoids collision with all obstacles. If the list of criteria is satisfied, criteria module 809 triggers outputs 811 to output the first trajectory and/or the controls/actions. If the list of criteria is not satisfied, criteria module 809 can trigger open space optimization model 421 to generate a second trajectory and/or control actions and outputs the second trajectory and/or control actions via outputs 811.

Figure 9:
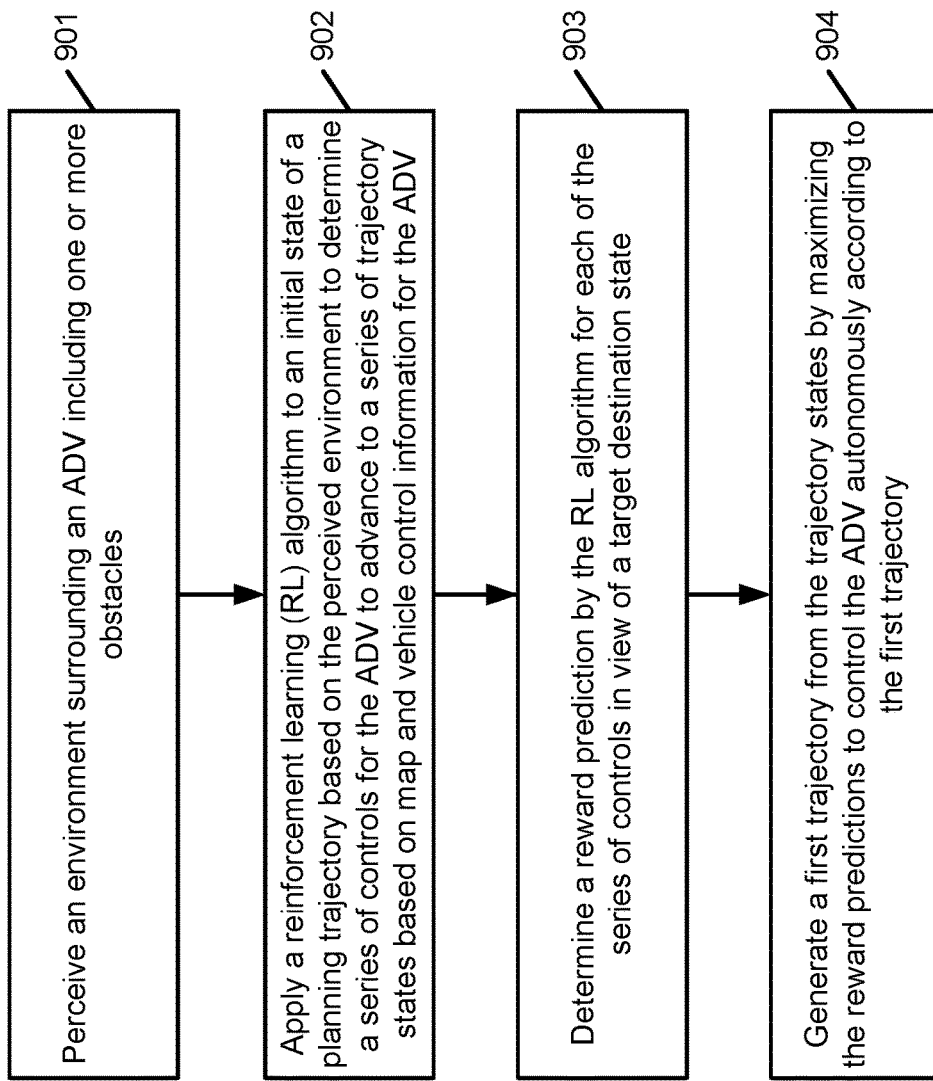
FIG. 9 is a flow diagram illustrating an example method according to one embodiment.

FIG. 9 is a flow diagram illustrating an example method according to one embodiment. Process 900 may be performed by processing logic which may include software, hardware, or a combination thereof. For example, process 900 may be performed by open space planning module 308 of FIG. 7. Referring to FIG. 9, at block 901, processing logic perceives an environment surrounding an ADV. At block 902, processing logic applies a reinforcement learning (RL) algorithm to an initial state of a planning trajectory based on the perceived environment to determine a list of controls for the ADV to advance to a list of trajectory states (e.g., next states) based on map and vehicle control information for the ADV. At block 903, processing logic determines a reward prediction by the RL algorithm for each of the controls in view of a target destination state. At block 904, processing logic generates a first trajectory from the trajectory states by maximizing the reward predictions to control the ADV autonomously according to the first trajectory.

In one embodiment, processing logic applies a judgment logic to the first trajectory to determine a judgment score for the first trajectory. In another embodiment, the judgment score includes scores for whether the first trajectory ends at the destination state, whether the first trajectory is smooth, and whether the first trajectory avoids one or more obstacles for the perceived environment.

In one embodiment, if the judgment score is below a predetermined threshold, processing logic further generates a second trajectory based on an open space optimization model to control the ADV autonomously according to the second trajectory. In another embodiment, the open space optimization model is to generate a trajectory for the ADV without following a reference line or traffic lines.

In another embodiment, the open space optimization model includes a vehicle dynamic model for the ADV. In another embodiment, the RL algorithm is performed by an actor neural network and a critic neural network, and wherein the actor neural network and critic neural network are deep neural networks.

Figure 10A:
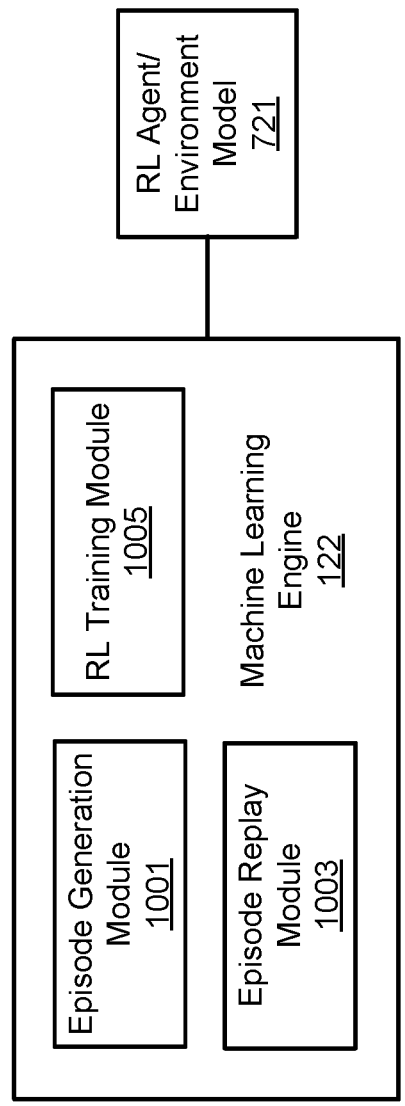
FIGS. 10A-10B are block diagrams illustrating examples of a machine learning engine for reinforcement learning according to one embodiment.
Figure 10B:
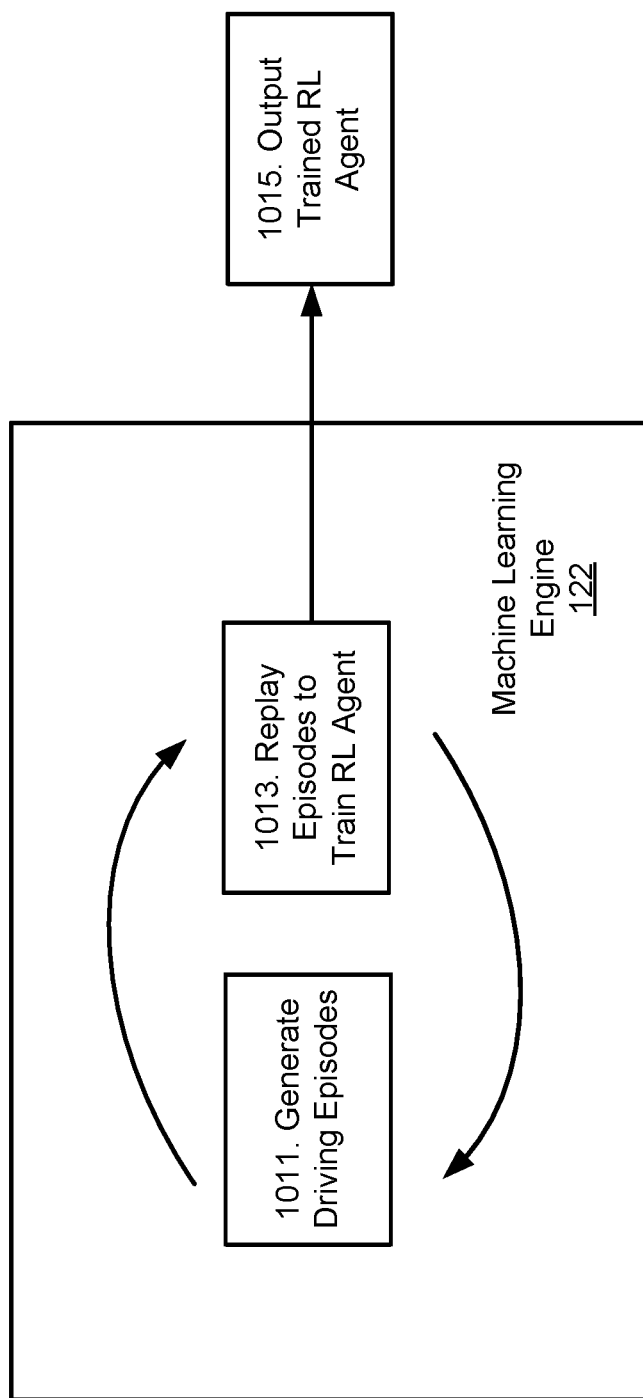

FIGS. 10A-10B are block diagrams illustrating examples of a machine learning engine for reinforcement learning according to one embodiment. Machine learning engine 122 of server 103 of FIG. 1 may be used to speed up the training of a RL agent offline. Referring to FIG. 10A, in one embodiment, machine learning engine 122 includes modules such as scenario generation module 1001, scenario replay module 1003, and RL training module 1005. The machine learning engine 122. Scenario generation module 1001 can generate a training scenario for RL training. An scenario is a sequence of states/actions which ends with a terminal state. When an scenario ends, the actor returns to an initial state. For example, an scenario for RL training may be a sequence of states to generate a driving trajectory from an initial state to the final state (e.g., destination spot), or a state within a region of interest of a high definition (HD) map that is deemed final. An scenario is different than a driving scenario as a driving scenario describes a particular driving event. A driving scenario may include one or more scenarios. Scenario replay module 1003 can replay an scenario. RL training module 1005 can train a RL agent using a replay of an scenario.

FIG. 10B illustrates an example block diagram to train a RL agent. Referring to FIG. 10B, in one embodiment, at block 1011, machine learning engine 122 generates one or more driving scenarios. An example scenario can be a confined to a trajectory generation (with an initial and a final trajectory states) for a U-turn on a roadway, or a self-parking maneuver within a parking lot. The generated scenario can include an initial position (e.g., initial state), a specified final destination (e.g., final state), and a two-dimensional (2D) top-down view image with an ADV at the initial position for the scenario. Machine learning engine 122 then is to train a RL agent to maneuver an ADV from the initial position to the specified final destination for the scenario. At block 1013, machine learning engine 122 can replay the scenarios to train an RL agent. The scenario replay allows the RL agent to interact with an environment model and learn by trial and error. The training (e.g., blocks 1011 and 1013) can repeat until the RL agent has achieved an optimal reward (e.g., convergence) or until the training has reached a maximum training iteration count. At block 1015, the trained RL agent is saved to algorithms/models 124, which can be later deployed onto the ADVs.

Figure 11:
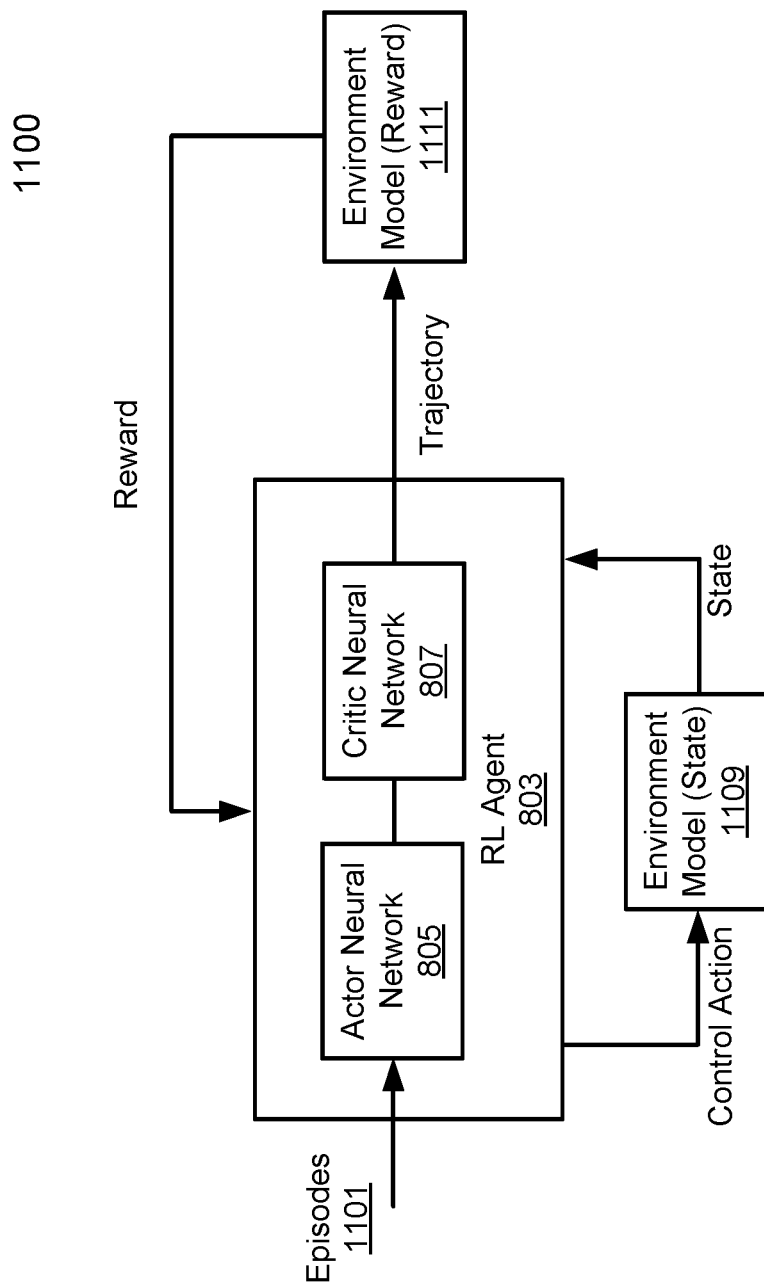
FIG. 11 is a block diagram illustrating an example of an offline reinforcement learning system according to another embodiment.

FIG. 11 is a block diagram illustrating an example of an offline reinforcement learning system according to another embodiment. System 1100 can be performed by machine learning engine 122 for server 103 of FIG. 1. Referring to FIG. 11, in one embodiment, system 1100 includes RL agent 803 to be trained, which includes actor neural network 805 and critic neural network 807 (e.g., an actor-critic framework). Actor NN 805 can generate a control action based on a current trajectory state. Critic NN 807 can generate a reward prediction (predict how good is the control action in view of a final trajectory state) based on the control action and the current trajectory state. Based on the reward prediction, actor NN 805 can be trained or updated to improve its control action outputs. RL agent 803 is coupled to environment model (state) 1109. Environment model (state) 1109 can generate a next trajectory state based on a control action. As such, RL agent 803 can interact with environment model (state) 1109 to iteratively output a number of trajectory states (e.g., $x_0 \ldots x_F$, a trajectory) and a number of control actions (e.g., e.g., $u_0 \ldots u_F$, controls and/or actions) for the RL agent to maneuver an ADV from an initial trajectory state (e.g., $x_0$) to a final trajectory state (e.g., $x_F$). RL agent 803 can be coupled to environment model (reward) 1111, which can generate an actual reward for the output trajectory and provide a feedback to RL agent 803. The reward can be fed back to RL agent 803 to further update critic neural network 807. The reward can a score to objectively evaluate the trajectory in view of a model-based trajectory output (e.g., such as an output from an optimization model, such as optimization model 421 of FIG. 4) based on a number of criteria, such as whether the first trajectory ends at the specified destination state, whether the first trajectory is smooth, and whether the first trajectory avoids a collision with the one or more obstacles for the scenario. Note that environment model (state) 1109 and environment model (reward) 1111 may be different instances of environment model 721 of FIG. 10A.

Figure 12:
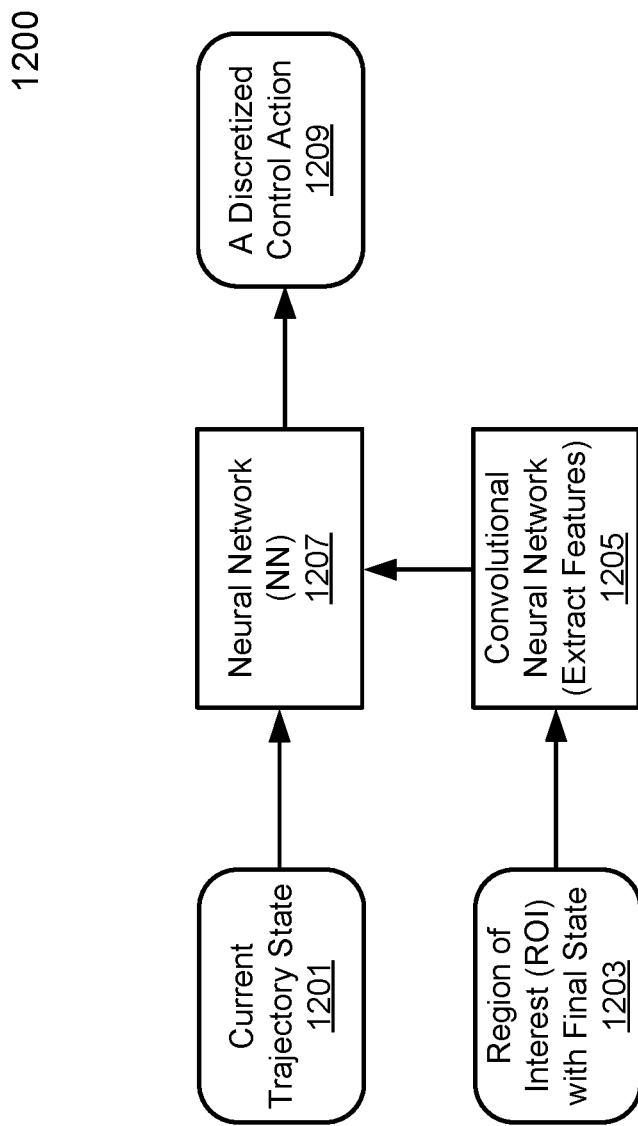
FIG. 12 is a block diagram illustrating an example of an actor neural network according to one embodiment.

FIG. 12 is a block diagram illustrating an example of an actor neural network (NN) according to one embodiment. Actor NN 1200 can represent actor NN 805 of FIG. 11. Referring to FIG. 12, actor NN 1200 includes NN 1207 and CNN 1205. For each time step, NN 1207 can receive one or more features from convolution NN (CNN) 1205, and a current trajectory state 1201 from an environment model (not shown) to generate a discretized control action 1209. The CNN 1205 can extract the one or more features from a region of interest (ROI) of a driving scenario (e.g., 2D top-down image) with final trajectory state (or final location) 1203. Note, features refer to the inputs to a CNN and represent attributes of the input data.

Note that, in machine learning, a convolutional neural network (CNN) usually consists of an input and an output layer, as well as multiple hidden layers. The hidden layers of a CNN typically consist of convolutional layers, RELU layer i.e. activation function, pooling layers, fully connected layers and normalization layers, that is, each neuron in one layer is connected to all neurons in the next layer. CNN is a class of NN that is usually applied to visual images. Note that discretized control action 1209 refers to a single vehicle control or action (from a number of possible control and/or action options) for a particular time step. The ROI includes information about obstacles, other vehicles, accessible roadways, curbs, etc. about the scenario for the region of interest.

An example of a control output may be to steer right by 10 degrees in heading direction, and apply a throttle to accelerator (e.g., heading direction, velocity, acceleration).

Figure 13:
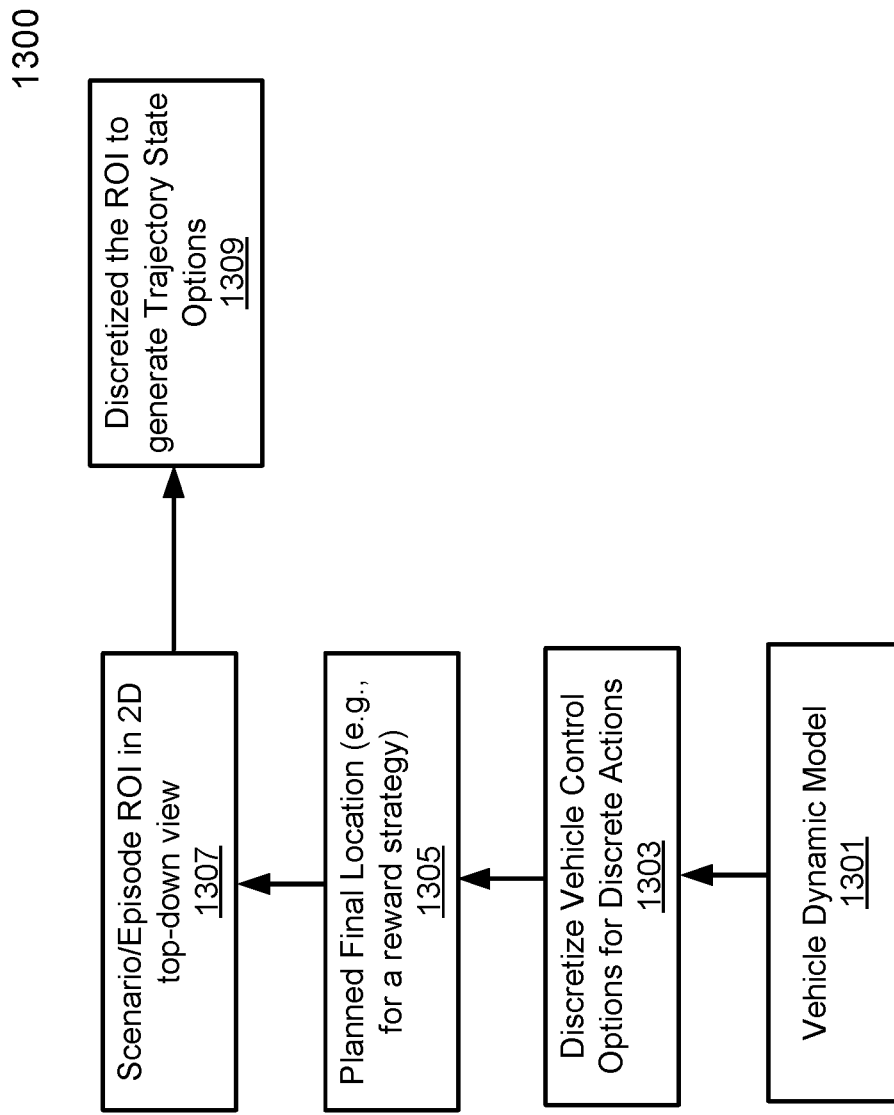
FIG. 13 is a block diagram illustrating an example environment model according to one embodiment.

FIG. 13 is a block diagram illustrating an example environment model according to one embodiment. Environment model 1300 can represent environment model (state) 1109 or environment model (reward) 1111 of FIG. 11. Environment model 1300 can model a simulated environment of an ADV (e.g., environment model (state) 1109 or environment model (reward) 1111 of FIG. 11) to interact with an RL agent to speed up reinforcement learning. Environment model 1300 can represent environment model 721 of FIG. 10A. Referring to FIG. 13, environment model 1300 can include vehicle dynamic model 1301 for an ADV. Vehicle dynamic model 1301 can model a vehicle dynamics system. Model 1301 can include a bicycle vehicle model. Model 1301 can further model a slip of the tires to model the ADV. Based on model 1301, environment model 1300 can derive a number of discretized vehicle control options (e.g., steer, throttle, or brake) for discretized vehicle actions (e.g., $u_0 \ldots u_F$) 1303. Based on the allowed control/action options 1303, environment model 1300 can derive final location 1305 that is within a limit of the vehicle dynamics model. Environment model 1300 may also derive a reward strategy to score different trajectories. The reward strategy can score a trajectory for whether the trajectory reached a final location (e.g., $x_F$, final trajectory state) 1305, whether the acceleration for the trajectory is smooth and the trajectory does not zig-zag, and whether the trajectory avoids all the obstacles. The planned final location 1305 is incorporated into driving scenario/scenario regions of interest (ROI) in 2D top-down views (e.g., images with a ROI mapping) 1307. Environment model 1300 can then discretize the ROI to generate a number of trajectory state options 1309. ROIs refer to regions of attention in an image for a neural network to process and analyze the image. Here, each driving scenario can include one or more ROIs.

Figure 14:
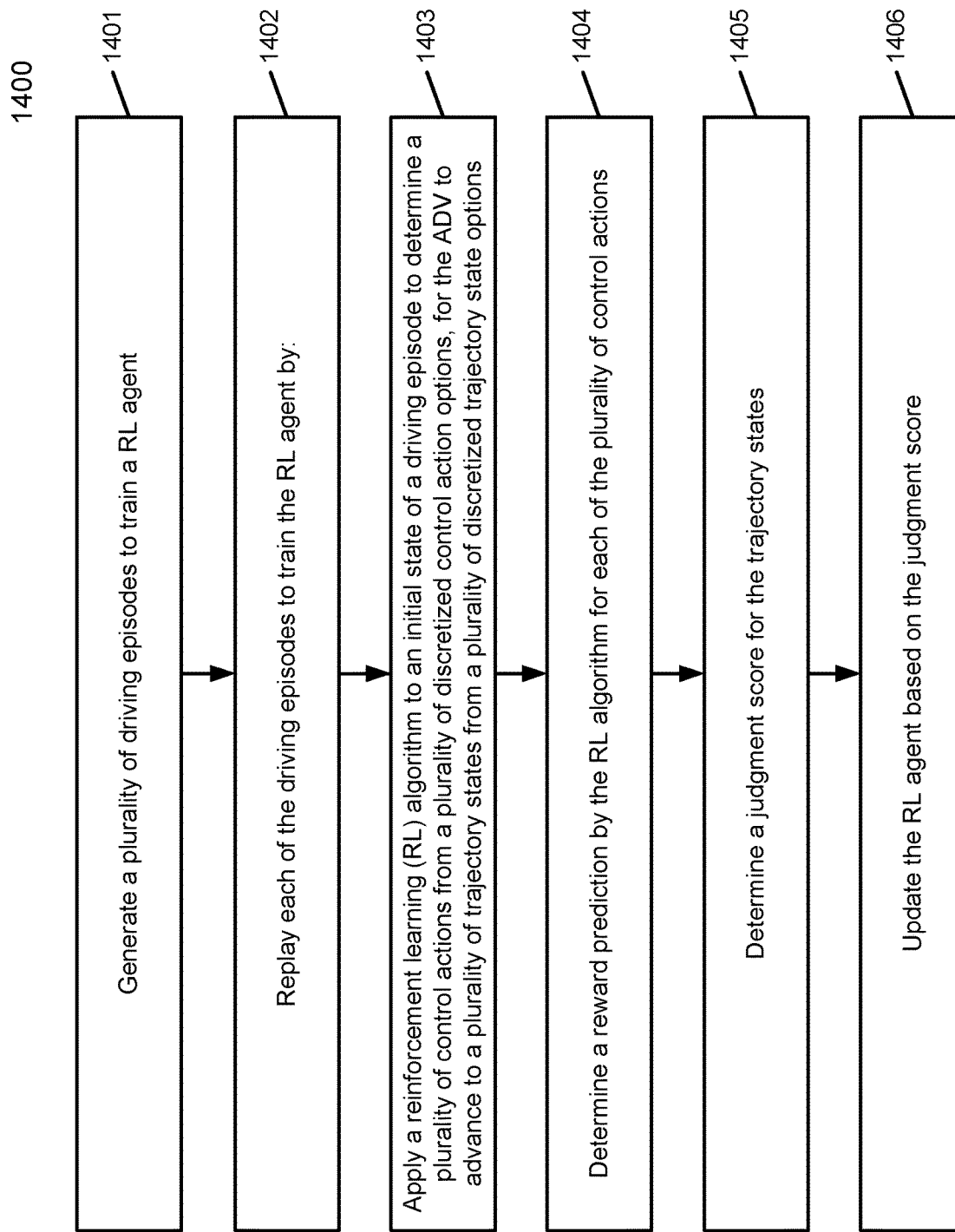
FIG. 14 is a flow diagram illustrating an example method according to one embodiment.

FIG. 14 is a block diagram illustrating an example method according to one embodiment. Process 1400 may be performed by processing logic which may include software, hardware, or a combination thereof. For example, process 1400 may be performed by machine learning engine 122 of FIG. 1. Referring to FIG. 14, at block 1401, processing logic generates a number of driving scenarios to train a RL agent. At block 1402, processing logic replays each of the driving scenarios to train the RL agent by, at block 1403, applying a reinforcement learning (RL) algorithm to an initial state of a driving scenario to determine a number of control actions from a number of discretized control action options, for the ADV to advance to a number of trajectory states from a number of discretized trajectory state options, at block 1404, determining a reward prediction by the RL algorithm for each of the control actions, at block 1405, determining a judgment score (e.g., reward) for the trajectory states (e.g., a generated trajectory), and at block 1406, updating the RL agent based on the judgment score (e.g., reward).

In one embodiment, the discretized control action options are generated base on a vehicle dynamic model for the ADV. In one embodiment, the discretized trajectory state options are generated by discretizing a region of interest for the each driving scenario in view of a final destination trajectory state.

In one embodiment, the judgment score includes scores for whether the first trajectory ends at the planned destination state, the first trajectory is smooth, and the first trajectory avoids the one or more obstacles of an environment model. In one embodiment, each driving scenario includes one or more regions of interest.

In one embodiment, the RL agent includes an actor neural network and a critic neural network, and wherein the actor and critic neural networks are deep neural networks. In another embodiment, the actor neural network includes a convolutional neural network.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 15:
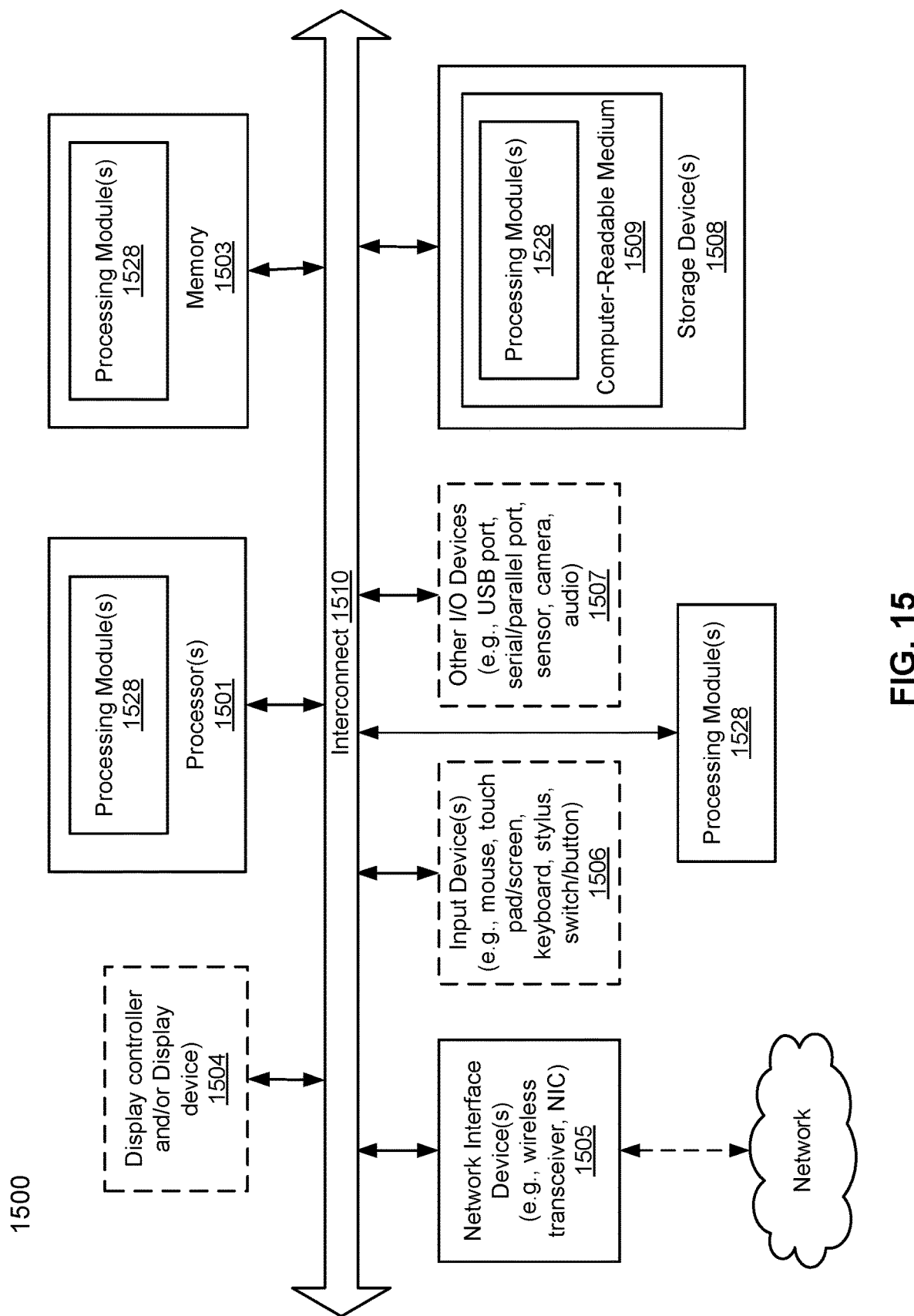
FIG. 15 is a block diagram illustrating a data processing system according to one embodiment.

FIG. 15 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, machine learning engine 122 of FIG. 1, planning module 305, control module 306, and open space planning module 308 of FIG. 3A. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
    perceiving an environment surrounding an autonomous driving vehicle (ADV);
    applying a reinforcement learning (RL) algorithm to an initial state of an initially planned trajectory based on the perceived environment to determine a plurality of controls for the ADV to advance to a plurality of trajectory states based on map and vehicle control information for the ADV;
    determining a reward prediction by the RL algorithm for each of the plurality of controls in view of a target destination state;
    generating a first trajectory from the trajectory states by maximizing the reward predictions;
    applying a judgment logic to the first trajectory to determine a judgment score for the first trajectory;
    determining that the judgment score is below a predetermined threshold; and
    generating a second trajectory based on an open space optimization model to control the ADV autonomously according to the second trajectory.

2. The method of claim 1, wherein the judgment score includes scores for whether the first trajectory ends at the target destination state, whether the first trajectory is smooth, and whether the first trajectory avoids one or more obstacles in the perceived environment.

3. The method of claim 1, wherein the open space optimization model is to generate a trajectory for the ADV without following a reference line or traffic lines.

4. The method of claim 1, wherein the open space optimization model includes a vehicle dynamic model for the ADV.

5. The method of claim 1, wherein the RL algorithm is performed by an actor neural network and a critic neural network, and wherein the actor neural network and the critic neural network are deep neural networks.

6. A non-transitory machine-readable medium having instructions stored therein, which when executed by a processor, cause the processor to perform operations, the operations comprising:
    perceiving an environment surrounding an autonomous driving vehicle (ADV);
    applying a reinforcement learning (RL) algorithm to an initial state of an initially planned trajectory based on the perceived environment to determine a plurality of controls for the ADV to advance to a plurality of trajectory states based on map and vehicle control information for the ADV;
    determining a reward prediction by the RL algorithm for each of the plurality of controls in view of a target destination state;
    generating a first trajectory from the trajectory states by maximizing the reward predictions;
    applying a judgment logic to the first trajectory to determine a judgment score for the first trajectory;
    determining that the judgment score is below a predetermined threshold; and
    generating a second trajectory based on an open space optimization model to control the ADV autonomously according to the second trajectory.

7. The non-transitory machine-readable medium of claim 6, wherein the judgment score includes scores for whether the first trajectory ends at the target destination state, whether the first trajectory is smooth, and whether the first trajectory avoids one or more obstacles for the perceived environment.

8. The non-transitory machine-readable medium of claim 6, wherein the open space optimization model is to generate a trajectory for the ADV without following a reference line or traffic lines.

9. The non-transitory machine-readable medium of claim 6, wherein the open space optimization model includes a vehicle dynamic model for the ADV.

10. The non-transitory machine-readable medium of claim 6, wherein the RL algorithm is performed by an actor neural network and a critic neural network, and wherein the actor neural network and the critic neural network are deep neural networks.

11. A data processing system, comprising:
    a processor; and
    a memory coupled to the processor to store instructions, which when executed by the processor, cause the processor to perform operations, the operations including perceiving an environment surrounding an autonomous driving vehicle (ADV),
        applying a reinforcement learning (RL) algorithm to an initial state of an initially planned trajectory based on the perceived environment to determine a plurality of controls for the ADV to advance to a plurality of trajectory states based on map and vehicle control information for the ADV,
        determining a reward prediction by the RL algorithm for each of the plurality of controls in view of a target destination state,
        generating a first trajectory from the trajectory states by maximizing the reward predictions,
        applying a judgment logic to the first trajectory to determine a judgment score for the first trajectory,
        determining that the judgment score is below a predetermined threshold, and
        generating a second trajectory based on an open space optimization model to control the ADV autonomously according to the second trajectory.

12. The system of claim 11, wherein the judgment score includes scores for whether the first trajectory ends at the target destination state, whether the first trajectory is smooth, and whether the first trajectory avoids one or more obstacles for the perceived environment.

13. The system of claim 11, wherein the open space optimization model is to generate a trajectory for the ADV without following a reference line or traffic lines.

14. The system of claim 11, wherein the open space optimization model includes a vehicle dynamic model for the ADV.

15. The system of claim 11, wherein the RL algorithm is performed by an actor neural network and a critic neural network, and wherein the actor neural network and the critic neural network are deep neural networks.

* * * * *